(12) United States Patent
Coleman

(10) Patent No.: X9051
(45) Date of Patent: Aug. 27, 1835

(54) GEARING MILLS

(76) Inventor: Claverius Coleman

Cleaverius R. Coleman. of Lunenburg cty. State of Virginia

Letters Patent

The schedule referred to in these Letters Patent and making part of the same, containing a description in the words of the said Cleaverius R. Coleman himself of his improvement in the geering, Water, Wind Steam, Horse, Hand, Saw, Cotton, Thrashing and Fanning Mills.

Be it known, that I Cleaverius R. Coleman of Lunenburg county and State of Virginia have made an improvement in the useful arts, being a method of geering, Water, Wind, Steam, Horse, Hand Saw, Cotton, Thrashing & Fanning Mills which is described as follows - This machine consists of the following principal parts - The frame which contains and supports the different parts of the Machinery to be made in the usual way of such a size as may be adapted to the purposes intended, the main axle with two cogwheels about three feet in diameter attached to it, and placed at any convenient distance from each other which wheels work in two other wheels on each side about one foot in diameter, and these four wheels (Viz) two on each side work in two cog rims, which rims are made fast to the frame with their cogs facing inwards or towards the centre so as to cause the four small wheels above named to work in the cogs of said rims and perform their evolutions and at the same time travel with their axle around the main axle and wheels above named. on each of these travelling axles is placed a cogwheel about three feet in diameter, which wheel works in an other wheel about one foot in diameter, made fast on a square box with a round hole in said box through which the centre axle passes; On the above named box is placed a wheel about three feet in diameter which is the driving wheel to the machinery, the travelling wheels placed at any convenient distance apart may be made of any proportion with the fixed wheels so as to give the desired velocity - Operations - The power being applied to the main shaft turns the two cogwheels made fast to it, these work into the small travelling cogwheels connected together by their travelling axle, and these travelling wheels work in the rim wheels and perform revolutions round the main axle, the effect which the travelling wheels have in working into the larger wheels is to make them perform one and a half revolutions for every revolution of the main axle; thus encreasing the speed to whatever may be required without much loss of power, these travelling cogwheels with the connecting axles may be encreased to multiply the speed of the driving wheel. For a further illustration of my invention I refer to the model and drawing deposited in the Patent Office. The invention here claimed and desired to be secured by Letters Patent consists in the arrangement and adaption of the several parts of the before described Machinery for the gearing of Water, Wind, Horse, Hand, Steam, Saw, Cotton, Thrashing and Fanning Mills -

Witnesses

Wm. A. Stone

Saml. Almand -

C. B. Coleman

Ex'd [illegible]